(12) United States Patent
Nagashima

(10) Patent No.: US 8,472,057 B2
(45) Date of Patent: Jun. 25, 2013

(54) INFORMATION PROCESSING APPARATUS, AND INFORMATION PROCESSING METHOD

(75) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 12/756,113

(22) Filed: Apr. 7, 2010

(65) Prior Publication Data

US 2010/0259787 A1   Oct. 14, 2010

(30) Foreign Application Priority Data

Apr. 10, 2009  (JP) ................................. 2009-096011

(51) Int. Cl.
*G06F 3/12*      (2006.01)
*G06K 15/00*     (2006.01)

(52) U.S. Cl.
USPC ......... 358/1.15; 358/1.16; 358/1.13; 358/1.6; 358/1.9

(58) Field of Classification Search
None
See application file for complete search history.

(56) References Cited

U.S. PATENT DOCUMENTS

| | | | |
|---|---|---|---|
| 2002/0067504 A1* | 6/2002 | Salgado et al. | 358/1.15 |
| 2003/0084132 A1* | 5/2003 | Ohta | |
| 2006/0044586 A1* | 3/2006 | Kujirai et al. | |
| 2006/0072140 A1* | 4/2006 | Mitani | 358/1.13 |
| 2007/0234354 A1* | 10/2007 | Hattori | |
| 2007/0245358 A1* | 10/2007 | Hattori et al. | |
| 2009/0213416 A1* | 8/2009 | Ishigure | 358/1.15 |
| 2010/0165391 A1* | 7/2010 | Nagashima | |

OTHER PUBLICATIONS

"Windows Point and Print Technical Overview." Microsoft Corporation Mar. 2003.

* cited by examiner

*Primary Examiner* — Satwant Singh
(74) *Attorney, Agent, or Firm* — Carter, DeLuca, Farrell & Schmidt LLP

(57) ABSTRACT

A client is used in an environment in which a printing method for causing a device to print printing data via a print server coexists with a printing method for transmitting print data to the device without the intervention of the print server for printout. If it is determined that a printer driver to be set up on the local printer is a newer version than that of a printer driver for a network printer and is shared therewith, a printer driver to be set up on the local printer is set up, and setting processing regarding a printer driver on the print server so as to cause the network printer to operate normally is performed.

11 Claims, 10 Drawing Sheets

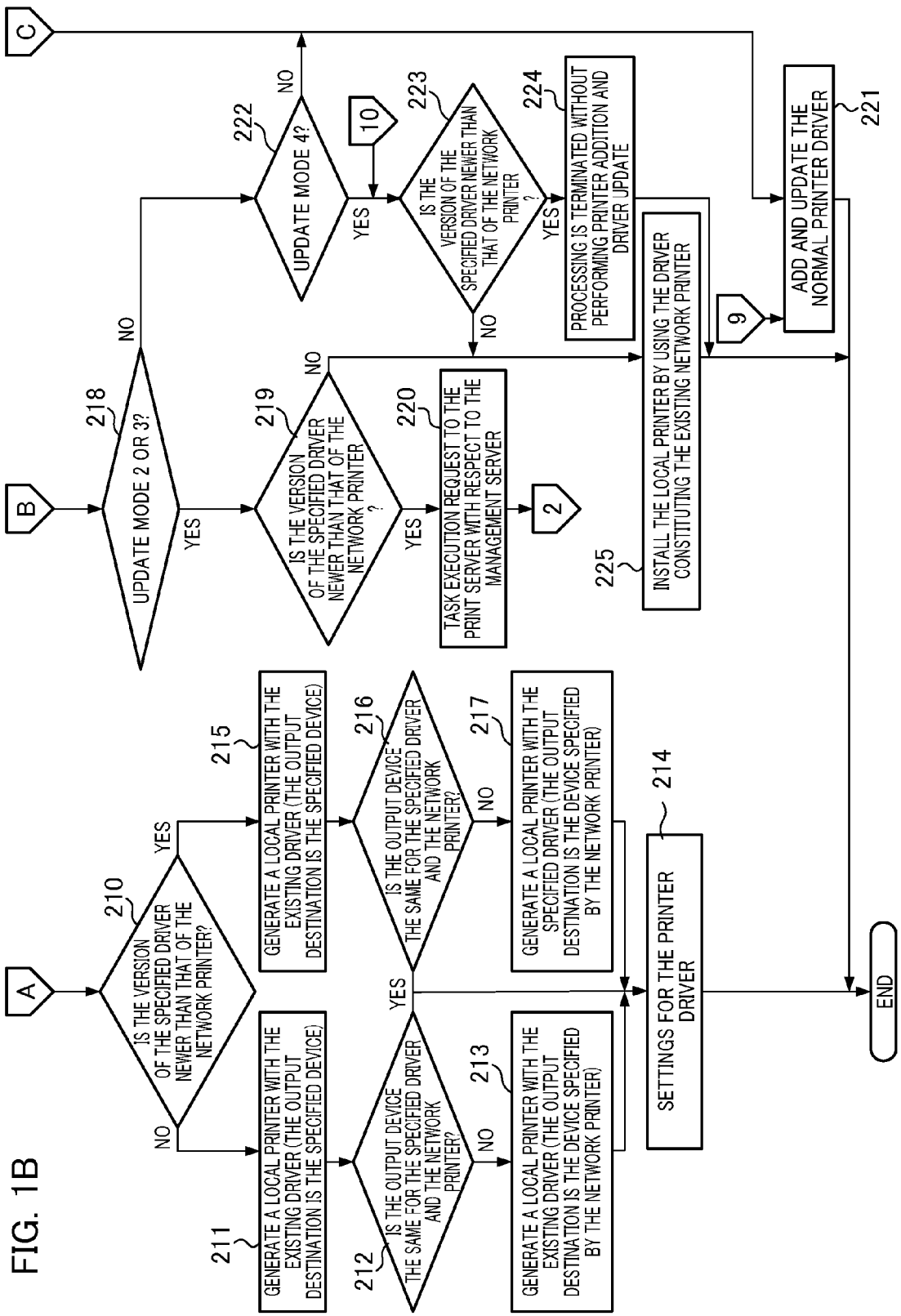

FIG. 3

| UPDATE MODE SETTING SCREEN | REGISTER | CANCEL |

PULL MODE PRIORITY:
  o UPDATE MODE 1
    · WHEN THE DRIVER TO BE INSTALLED IS THE SAME KIND AS THAT OF THE NETWORK PRINTER, THE NETWORK PRINTER IS CHANGED TO THE LOCAL PRINTER.

PRINT SERVER MODE PRIORITY:
  o UPDATE MODE 2
    · BRING THE PRINT SERVER UNDER CONTROL WHEN THE PRINT SERVER IS NOT UNDER CONTROL OF THE CLIENT, AND ENSURE THE INTEGRITY OF THE VERSION OF THE DRIVERS USED FOR THE SHARED PRINTER ON THE PRINT SERVER, THE NETWORK PRINTER ON THE CLIENT, AND THE LOCAL PRINTER.
  o UPDATE MODE 3
    · ONLY WHEN THE PRINTER SERVER IS UNDER THE CONTROL OF THE CLIENT, THE INTEGRITY OF THE VERSION OF THE DRIVERS FOR THE SHARED PRINTER ON THE PRINT SERVER, THE NETWORK PRINTER ON THE CLIENT, AND THE LOCAL PRINTER IS ENSURED.
  o UPDATE MODE 4
    · THE DRIVER VERSION OF THE NETWORK PRINTER FOR THE CLIENT IS PRIORITIZED.

| REGISTER | CANCEL |

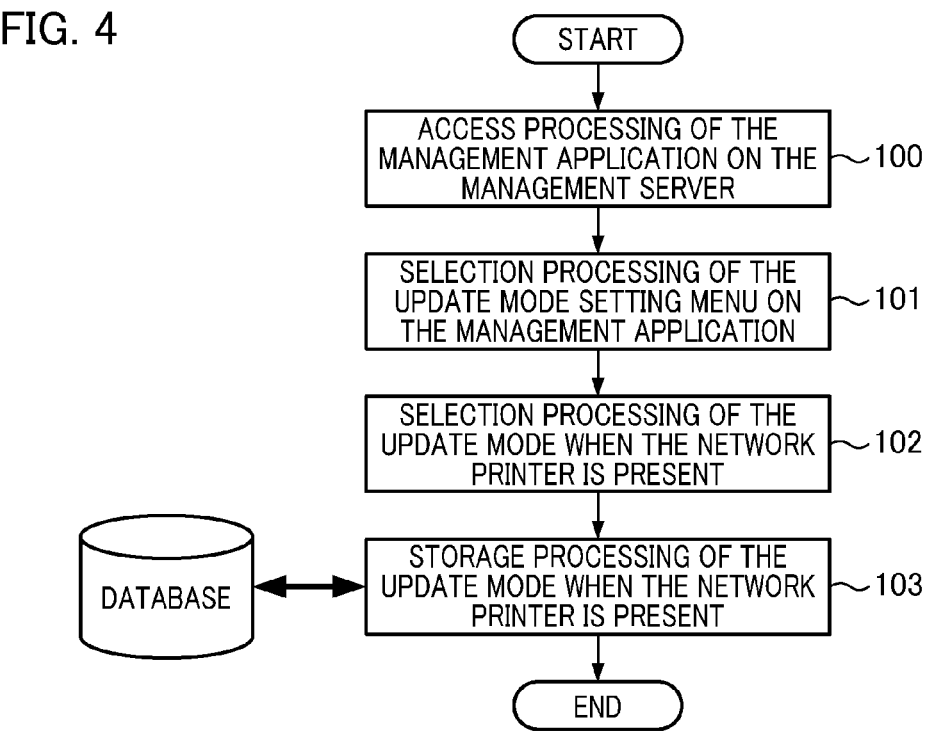

FIG. 4

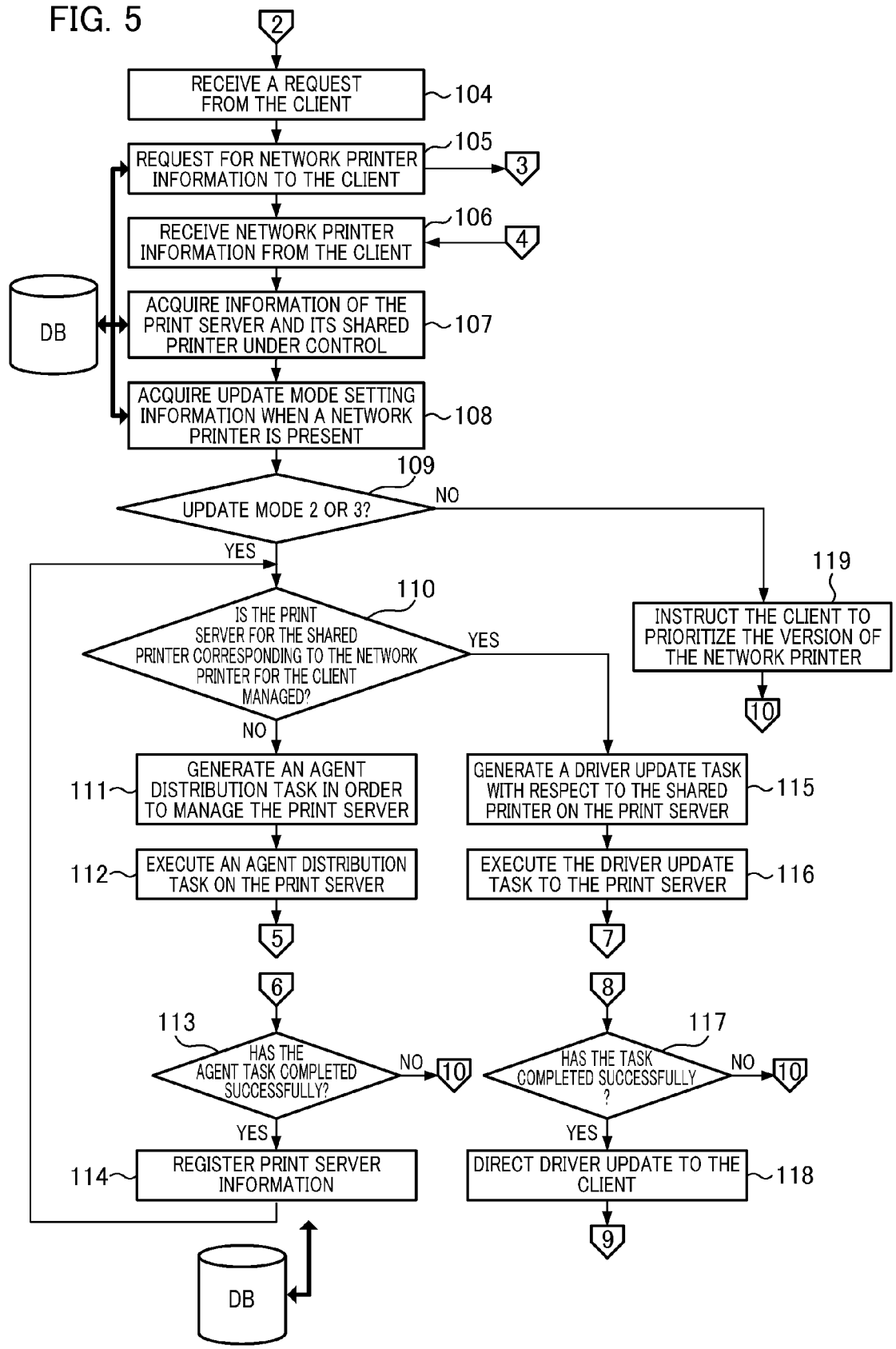

FIG. 7A

| OPERATIONAL MODE |
|---|
| UPDATE MODE 1 |

FIG. 7B

| NETWORK PRINTER NAME | DRIVER NAME OF NETWORK PRINTER | DRIVER VERSION | PRINT SERVER NAME | SHARED PRINTER NAME |
|---|---|---|---|---|
| PRINTER A | DRIVER A | 1.00 | PRINT SERVER 4000 | SHARED B |

FIG. 7C

| PRINT SERVER NAME | SHARED PRINTER NAME | DRIVER NAME | DRIVER VERSION | PRINTER NAME |
|---|---|---|---|---|
| PRINT SERVER A | SHARED A | DRIVER A | 1.00 | PRINTER A |

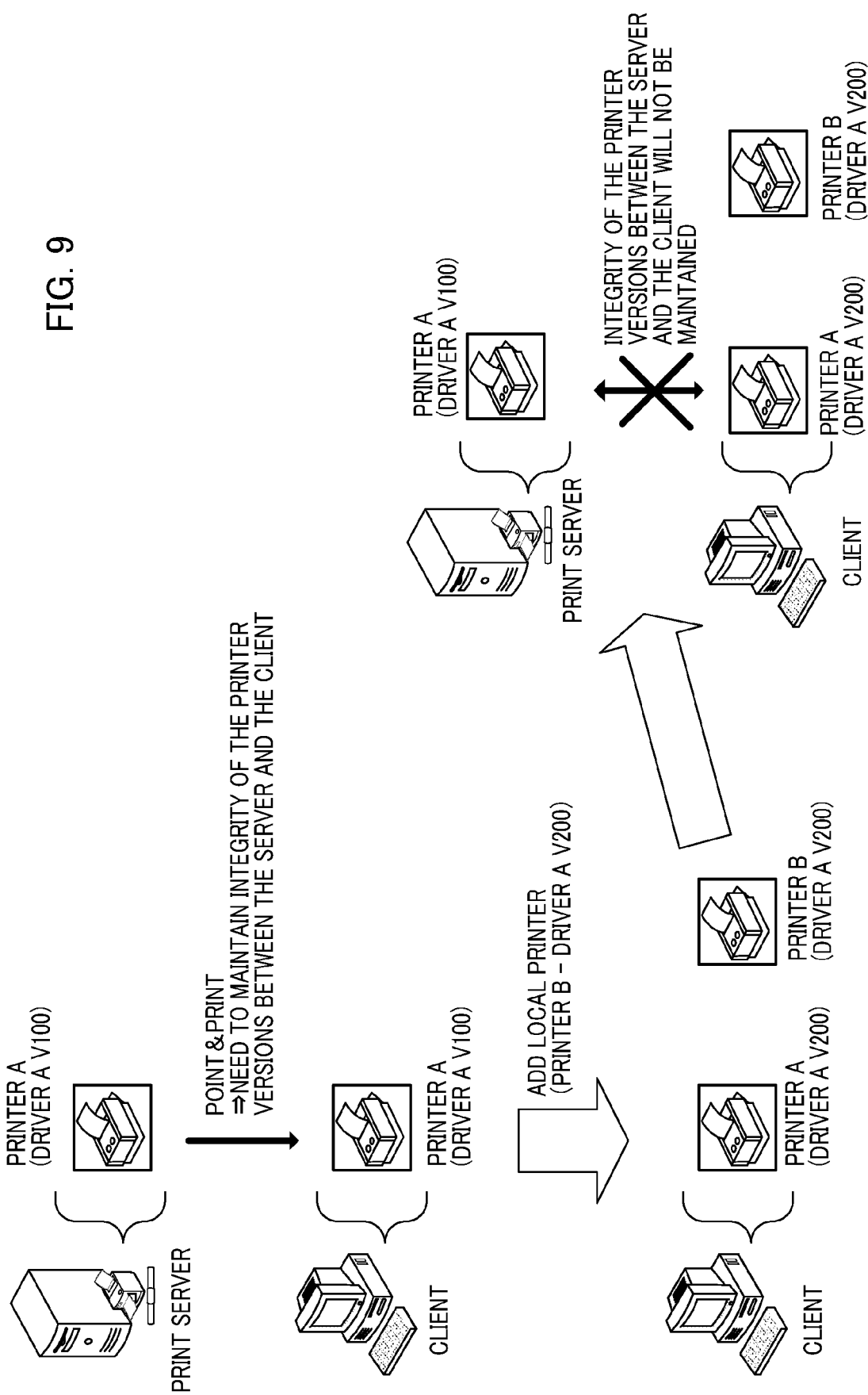

FIG. 10

INFORMATION PROCESSING APPARATUS, AND INFORMATION PROCESSING METHOD

BACKGROUND OF THE INVENTION

1. Field of the Invention

The present invention relates to a printing system and a method for controlling the same, in particular, relates to an information processing apparatus for managing a device, a client machine, which are provided on a network, and software required for printing by using an administration server, and a program for controlling the same. Hereinafter, the term "client machine" as used herein is referred to simply as "client". Print data-forming software installed on a client is so-called a printer driver, and hereinafter is also referred to as "driver".

2. Description of the Related Art

Conventionally, a network printing environment provided with a client, a print server, a printer, and an administration server for managing these has been proposed. A printing method using the printer driver corresponding to a shared printer on the print server and the driver corresponding to the network printer object is known. There is another printing method using a printer driver that corresponds to the local printer object locally connected to the client. The technique for forming a network printer object corresponding to a shared printer on the client is disclosed, for example, in "Windows Point and Print Technical Overview", Microsoft, Published: Mar. 21, 2003, Update: Nov. 20, 2006.

On the client, for example, when the printer driver corresponding to the local printer object is updated, its printer object may overwrite the printer driver corresponding to the network printer object. Consequently, the versions and the like between the print server-side printer driver corresponding to the shared printer object and the printer driver corresponding to the network printer object may become inconsistent.

As a result, printing via the print server may be disabled from the client using the network printer, or incorrect print results may be obtained. Therefore, a printing system environment cannot be appropriately maintained in the prior art, resulting in problems associated with maintenance and management.

SUMMARY OF THE INVENTION

In order to solve these situations, the present invention provides an information processing apparatus that has a function of transmitting print data to a network printer via a locally connected local printer or a print server for print processing. In addition, the information processing apparatus is used in an environment in which a printing method for processing print data by using a printer driver installed on the print server to cause the network printer to print the print data coexists with a printing method for transmitting print data to the locally connected local printer without the intervention of the print server for printout. The information processing apparatus includes a determination unit and a setting unit.

The determination unit determines whether or not a printer driver to be set up on the local printer is newer version than that of a printer driver for a network printer, which is set up on the information processing apparatus, and is shared therewith.

The setting unit sets up a printer driver to be set up on the local printer driver as well as perform settings on a printer driver for the print server so as to cause the network printer to operate normally if the determination unit determines that a printer driver to be set up on the local printer is a newer version than that of a printer driver for a network printer, which is set up on the information processing apparatus, and is shared therewith.

When a local printer is updated in a printing environment where a network printer coexists with the local printer, the settings for a printer driver on the print server are performed so as to cause the network printer to operate normally. With this arrangement, a driver version can be appropriately managed, and thereby a normal printing system environment can be maintained and the convenience of maintenance and management can be improved as well.

Further features of the present invention will become apparent from the following description of exemplary embodiments with reference to the attached drawings.

BRIEF DESCRIPTION OF THE DRAWINGS

FIG. 1B is a flowchart illustrating exemplary processing of the client according to an embodiment of the present invention together with FIGS. 2 to 10.

FIG. 3 is a diagram illustrating an example of a user interface screen for the update mode settings.

FIG. 4 is a flowchart illustrating exemplary pre-processing performed at the administration server.

FIG. 5 is a flowchart illustrating exemplary processing performed at the administration server.

FIG. 7A is a diagram illustrating an exemplary stored table of update mode selection information.

FIG. 7B is a diagram illustrating an exemplary stored table of client information.

FIG. 7C is a diagram illustrating an exemplary stored table of print server information.

FIG. 9 is a schematic representation for explaining the case where a network printer and a local printer coexist.

FIG. 10 is a diagram illustrating an exemplary installation rule table.

DESCRIPTION OF THE EMBODIMENTS

Hereinafter, preferred embodiments of the present invention will now be described with reference to the attached drawings.

Figure 8A:
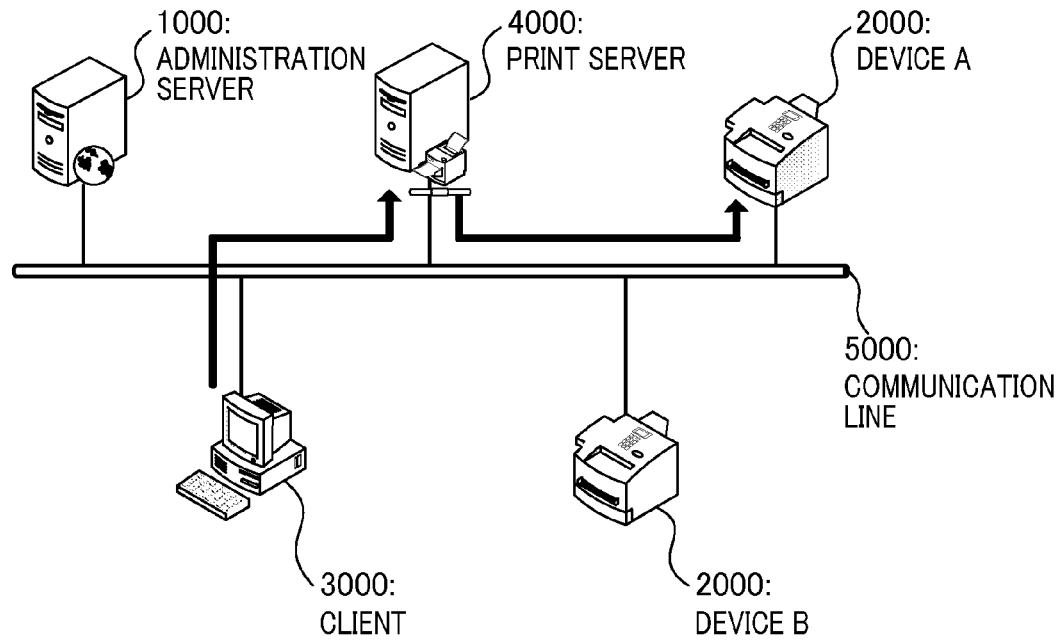
FIGS. 8A and 8B are conceptual diagrams illustrating an exemplary network printing system environment and printing method.
Figure 8B:
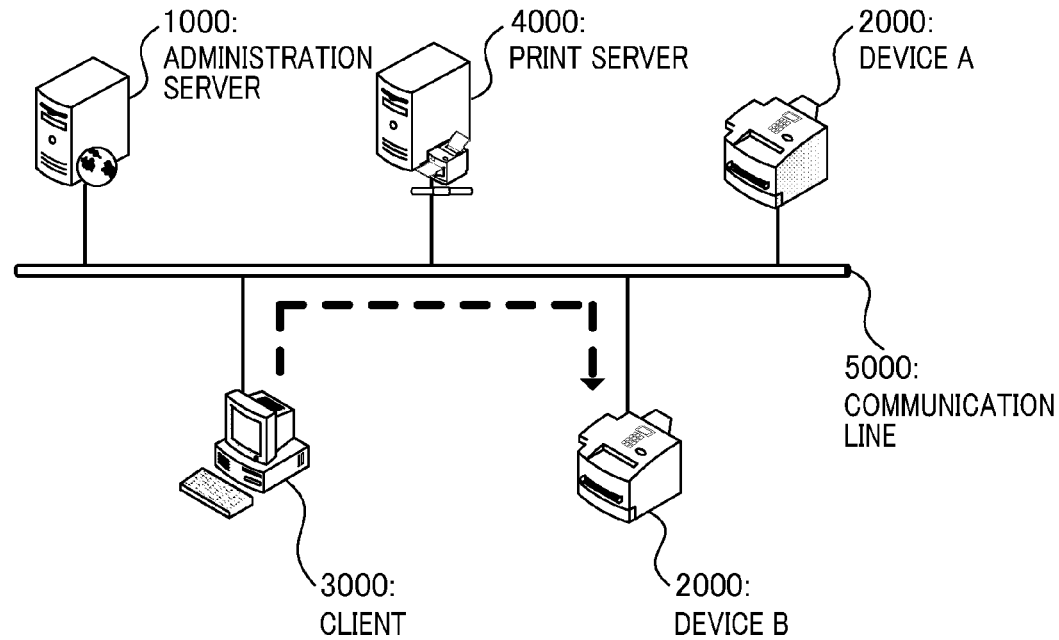

In the network printing system environment exemplified in FIGS. 8A and 8B, a device 2000 having a printing function, a client 3000, a print server 4000, and a management server 1000 for managing these components are connected to each other via a communication line 5000. Here, the client 3000 transmits print data to a locally connected local printer or a network printer via the print server 4000 for print processing.

In such a system environment, the following printing methods are available.

One is a method for processing print data by using the printer driver installed on the print server 4000 so as to cause the network printer to print the print data. As shown in print paths indicated by the solid line in FIG. 8A, this is a printing method via a print server, in which print data is transmitted from the client 3000 to the device A via the print server 4000 for printout. In other words, in this method, a shared printer object is generated on the print server 4000, and a network printer object corresponding to the printer is generated on the client 3000 so as to perform printing via the print server 4000.

Another is a method for transmitting print data to a local printer without the intervention of the print server 4000 for printout. In this case, as shown in the print path indicated by the dotted line in FIG. 8B, print data is transmitted from the local printer of the client 3000 directly to the device B for printout. In other words, printing is directly performed from the client 3000 without the intervention of the print server 4000.

Thus, the client 3000 is available in an environment in which two different methods coexist.

Hereinafter, the aforementioned terms will be described.

First, the term "administration server" as used herein refers to a server that comprehensively performs device searching, operating state monitoring, various settings, and the like mainly conducted by the IT (information technology) administrator. In other words, the administration server searches for a device to be managed, monitors whether or not the found device is in normal operation, and further sets MIB (Management Information Base) information and the like held by the device. Furthermore, the administration server has an additional function that directs installation processing or uninstallation processing for an appropriate print driver corresponding to the device with respect to a plurality of clients or a print server. Here, as used herein, the printer object is the settings for a printer which is registered at a registry managed by the print server or the OS provided in the client 3000. More specifically, a print destination (address), a printer name, a driver path, and printer attributes (shared printer, network printer, local printer, and the like) are stored in the printer object.

Next, the term "shared printer method" as used herein refers to an installation mode of a printer driver, in which settings are made to share the printer driver installed on the print server so as to allow for use from a plurality of clients. The shared printer object is a structure that includes various settings of a shared printer to be set on the print server. The shared printer object performs communication between a network printer to be described below and various objects so as to realize print processing.

The term "network printer object" as used herein refers to a structure to be installed on a client in a manner corresponding to a shared printer in order to utilize the shared printer on the client. For example, the network printer corresponding to the shared printer can be formed on the client by using the Point and Print function provided by the operating system Windows™ developed by Microsoft (e.g., see "Windows Point and Print Technical Overview", Microsoft, Published: Mar. 21, 2003, Update: Nov. 20, 2006).

In this system, it is important that the shared printer on the print server and the printer driver for the network printer on the client are synchronized. The synchronization for the printer drivers here means maintaining the identity of the driver attributes. In other words, the print driver includes attributes such as the manufacturer, direction, PDL (e.g., page description language for forming a print job such as PCL, PostScript, or the like), and version. The synchronization for the printer drivers means maintaining the identity of these attributes. In particular, when focusing on a single printer driver, the version of the print driver is often upgraded to deal with fault countermeasure and functional improvement. In such a case, if the printer driver of a shared printer is version 1.00 for example, the network printer on the client, which corresponds to the shared printer, also needs to be upgraded to version 1.00.

In the printing method via a print server, the network printer on the client essentially performs document settings for forming a print job, and the shared printer on the print server performs device settings and spooling. As used herein, the term "document settings" means the items to be set individually for printing, such as sheet size, copies, the method for feeding sheets, and the like for forming a print job. On the other hand, the term "device settings" refers to the items to be uniquely determined by the device, which include port settings, sheet-discharging options that can be used in the device, and the like. In other words, document settings are the items to be set individually for each client, and device settings are the items to be set for clients in common. Note that in the printer driver for Windows™, such settings can be made by a property function held by each of the printer drivers. In addition, rendering processing for forming a print job may be performed by the print server.

In this way, in the printing method for printing via the print server, print processing is realized by the client and the printer driver on the print server in a pair-wise form.

For the Point and Print function, when a version upgrade of the shared printer on the print server is made, an automatic version upgrade of the client network printer corresponding to the shared printer is also made.

Next, the term "local printer" as used herein generally refers to a printer connected locally to a client. For a local printer, the client may perform all processing for printing, such as document settings, device settings, rendering processing, spool processing, port processing, and the like. Hence, in the printing method using a local printer, a print job formed by the client printer driver is transmitted directly to the device without the intervention of the print server.

As described above, there are two different modes for realizing printing from the client to the device. One is a mode for employing the network printer corresponding to the shared printer on the print server, and the other is a mode for employing an individually-installed local printer.

Here, it should be noted that a version upgrade of the printer driver on the client is different between the network printer and the local printer. In other words, there is no need for the client to perform individual updates for the network printer. This is because the network printer corresponding to the shared printer is automatically updated when the version of the shared printer on the print server is upgraded.

In contrast, an update for a local printer needs to be performed separately for each client.

However, in the prior art described above, the problem of the integrity of the printer driver exists when the network printer and the local printer are present on the client.

In other words, assume the case where the version of the printer driver for the local printer is upgraded when the network printer and the local printer have the same kind of the printer driver and are shared with an output device. With this version upgrade, the version of the same printer driver for the network printer is also upgraded. Consequently, the print driver of the shared printer on the print server and the print driver of the network printer on the client become different and are inconsistent with each other.

FIG. 9 shows such a case. The shared printer A with the printer driver A (v100) is generated on the print server. Here, the term "v100" as used herein means the printer driver version 1.00.

Next, using the Point and Print function, the network printer A (v100) corresponding to the shared printer A is generated on the client.

Thereafter, the printer driver A (v200) for the local printer B is installed on the client. In other words, the term "v200" as used herein means the printer driver version 2.00, the printer driver A (v200) is an upgraded version of the printer driver A (v100).

With this arrangement, the version of the network printer A (v100) on the client is also upgraded to the printer driver A (v200).

As a result, although the network printer A on the client is upgraded to version 2.00, the shared printer A for the print server corresponding thereto remains at version 1.00.

Hereinafter, the preferred embodiments of the present invention will now be described with reference to the attached drawings.

Prior to the explanation of the flowchart shown in FIGS. 1A and 1B, the configuration of the printing system environment will be described.

Figure 2:
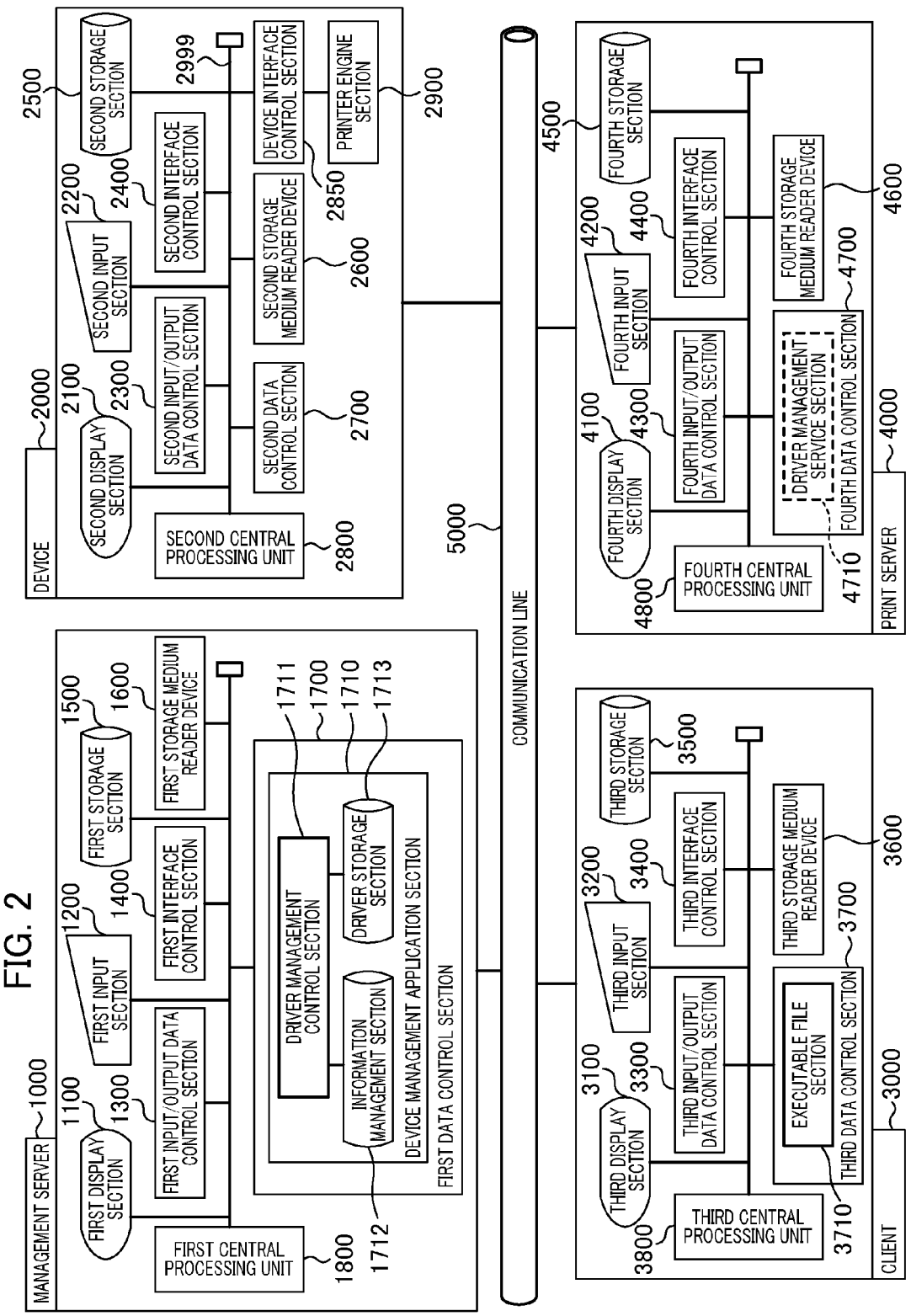
FIG. 2 is a block diagram illustrating an exemplary system configuration.

FIG. 2 is a block diagram illustrating an exemplary application of the present embodiment. The present system is composed of the management server 1000, the device 2000 having a printing function, the client 3000 representing a client machine, and the print server 4000. These devices are communicatably connected with each other via the communication line 5000. Note that the communication line 5000 is composed of a conventional LAN or a bi-directional serial interface such as IEEE1394, USB, and the like.

Each of the information processing apparatuses is configured with a computer, includes one central processing unit 1800, 2800, 3800, and 4800, respectively, and functions as a main control unit. In other words, the management server 1000 includes the first central processing unit 1800, and the device 2000 includes the second central processing unit 2800. The client 3000 includes the third central processing unit 3800, and the print server 4000 includes the fourth central processing unit 4800.

For each of the information processing apparatuses, program and relevant data are stored on a storage medium such as FD, CD-ROM, IC memory card, and the like, and are read out from storage medium reader devices 1600, 2600, 3600, and 4600, respectively. In other words, the management server 1000 includes a first storage medium reader device 1600, and the device 2000 includes a second storage medium reader device 2600. The client 3000 includes a third storage medium reader device 3600, and the print server 4000 includes a fourth storage medium reader device 4600. The storage medium may be configured with a hard disk, an optical magnetic disk, or the like, or may be configured in combination with these units.

The storage sections 1500, 2500, 3500, and 4500 are provided in each of the apparatuses, and the system program and the application program are loaded from these storage sections to data control sections 1700, 2700, 3700, and 4700, respectively. In other words, the management server 1000 includes a first storage section 1500 and a first data control section 1700, and the device 2000 includes a second storage section 2500 and a second data control section 2700. The client 3000 includes a third storage section 3500 and a third data control section 3700, and the print server 4000 includes a fourth storage section 4500 and a fourth data control section 4700. Note that the first data control section 1700 is configured using a device management application section 1710. In addition, the third data control section 3700 is configured using an executable file section 3710, and the fourth data control section 4700 is configured using a driver management service section 4710. The details of which will be described later.

The system program and the application program process display information on display sections 1100, 2100, 3100, and 4100 of each apparatus and information that has been input from input sections 1200, 2200, 3200, and 4200 of each apparatus. In other words, the management server 1000 includes a first display section 1100 and a first input section 1200, and the device 2000 includes a second display section 2100 and a second input section 2200. The client 3000 includes a third display section 3100 and a third input section 3200, and the print server 4000 includes a fourth display section 4100 and a fourth input section 4200. Note that a display device such as a CRT display, a liquid crystal display, or the like can be used for the display sections 1100, 2100, 3100, and 4100. Also, the input sections 1200, 2200, 3200, and 4200 can be configured with a pointing device such as keyboard, mouse, or the like. Each apparatus is provided with input/output data control sections 1300, 2300, 3300, and 4300. In other words, the management server 1000 includes a first input/output data control section 1300, and the device 2000 includes a second input/output data control section 2300. The client 3000 includes a third input/output data control section 3300, and the print server 4000 includes a fourth input/output data control section 4300.

Each apparatus performs the input and output of data via interface control sections 1400, 2400, 3400, and 4400 thereof. In other words, the management server 1000 includes a first interface control section 1400, the device 2000 includes a second interface control section 2400. The client 3000 includes a third interface control section 3400, and the print server 4000 includes a fourth interface control section 4400.

Components in the apparatus are communicatably connected with each other via a bus. For example, each component of the device 2000 is connected to each other via a bus 2999.

The device 2000 is a printing device having a print processing function, and includes a device interface control section 2850 and a printer engine section 2900. The device 2000 may be a single function peripheral (SFP) having only a printing function, or a multi function peripheral (MFP) having a scanner function, copying function, fax function, and the like, in addition to the print function. Furthermore, the device 2000 holds device information such as MIB. Acquiring and setting such information are performed by an IT administrator from the management server 1000 via a network.

On the client 3000, printing becomes possible either by performing printing using the network printer from the device 2000 via the print server 4000, or by transmitting print data directly to the device 2000 via the local printer. These print paths are as shown in FIGS. 8A and 8B.

In a printing method via a network printer, as shown by the solid line in FIG. 8A, print data is transmitted from the client 3000 to the device 2000 (device A) via the print server 4000.

In a printing method via a local printer, as shown by the dotted line in FIG. 8B, print data is directly transmitted from the client 3000 to the device 2000 (device B). In other words, this method does not pass through the print server 4000 as a print path.

Here, on the print server 4000, a driver is installed as a shared printer so as to provide a network printer to the client 3000 using the Point and Print function from the client 3000.

Next, an essential part of a system configuration to which the present invention is applied will be described with reference to FIG. 2.

The main components are the device management application section 1710 of the management server 1000, the executable file section 3710 of the client 3000, and the driver management service section 4710 of the print server 4000.

Furthermore, the device management application section 1710 is configured with a driver management control section 1711, an information management section 1712, and a driver storage section 1713.

The device management application section 1710 has a search function for the device 2000. As a result of device searching, the device name, IP address for the device, or the like is acquired. Here, the term "device searching" means searching with a known SNMP, IP Broadcast, SLP/Multicast, and the like.

The driver management control section 1711 has a driver task function for realizing an addition of a printer or a driver update, and an executable file download function for realizing driver installation.

Hereinafter, in the present embodiment, the driver task function that realizes the addition of a printer and driver update is referred to as a "PUSH function", and the executable file download function for realizing driver installation is referred to as a "PULL function".

The PUSH function denotes a function in which an IT administrator remotely installs a driver corresponding to any device on the client 3000 or the print server 4000.

On the other hand, the PULL function permits the download of an executable file for installing a driver corresponding to any device from the client 3000.

By executing the executable file on the client 3000, the executable file acquires information required for installation of the driver from the driver management control section 1711 so as to realize installation. Here, the term "information required for installation of the driver" as used herein means information such as location information about the entity of the driver to be installed, the IP address of the device 2000, required for generating a printer port, or the like. Hereinafter, the term "information required for installation of the driver" is referred to as "driver information".

Also, the executable file section 3710 is configured by using the executable file.

Information exchange between the executable file section 3710 and the driver management control section 1711 is carried out by communication with a Web service that employs a protocol such as so-called SOAP (Simple Object Access Protocol).

In other words, the PUSH function is an installation of a driver to the client 3000 and the print server 4000 on the initiative of the management server 1000, whereas the PULL function is an installation of a driver on the initiative of the client.

However, in the PUSH function, an agent service needs to be previously installed on the client 3000 or the print server 4000 of the target in order to execute a driver task. Here, the driver management service section 4710 for the print server 4000 is configured by using the agent service. In other words, this process is carried out by using what is termed a service program having a driver installation function.

Information exchange between the driver management service section 4710 and the driver management control section 1711 is carried out by communication with a Web service that employs a protocol such as SOAP or the like, as in information interaction between the executable file section 3710 and the driver management control section 1711.

Also, as in the executable file section 3710, the driver management service section 4710 has functions such as acquiring the driver stored in the driver storage section 1713, acquiring printer port information, and installing a driver.

The driver storage section 1713 is an FTP (File Transfer Protocol) server, an HTTP (Hypertext Transfer Protocol) server, a file server, or the like, and is a server on which a driver is stored. The driver is a printer driver that serves as software for forming print data. The driver stored on the driver storage section 1713 can be downloaded from the executable file section 3710 and the driver management service section 4710.

On the other hand, the information management section 1712 is configured using so-called database (DB). The information management section 1712 manages table information as shown in FIG. 7 for example. In addition, the information management section 1712 manages update mode setting information (see FIG. 3) provided by the driver management control section 1711 and attribute information of the driver managed by the driver storage section 1713.

Note that the information management section 1712 and the driver storage section 1713 may be provided on the same server as the management server 1000, as in the present embodiment, or may be provided in a separate server.

Hereinafter, the details of the control procedure according to the present embodiment will be described with reference to FIG. 2 in addition to FIGS. 1A and 1B and FIGS. 3 to 6.

Figure 1A:
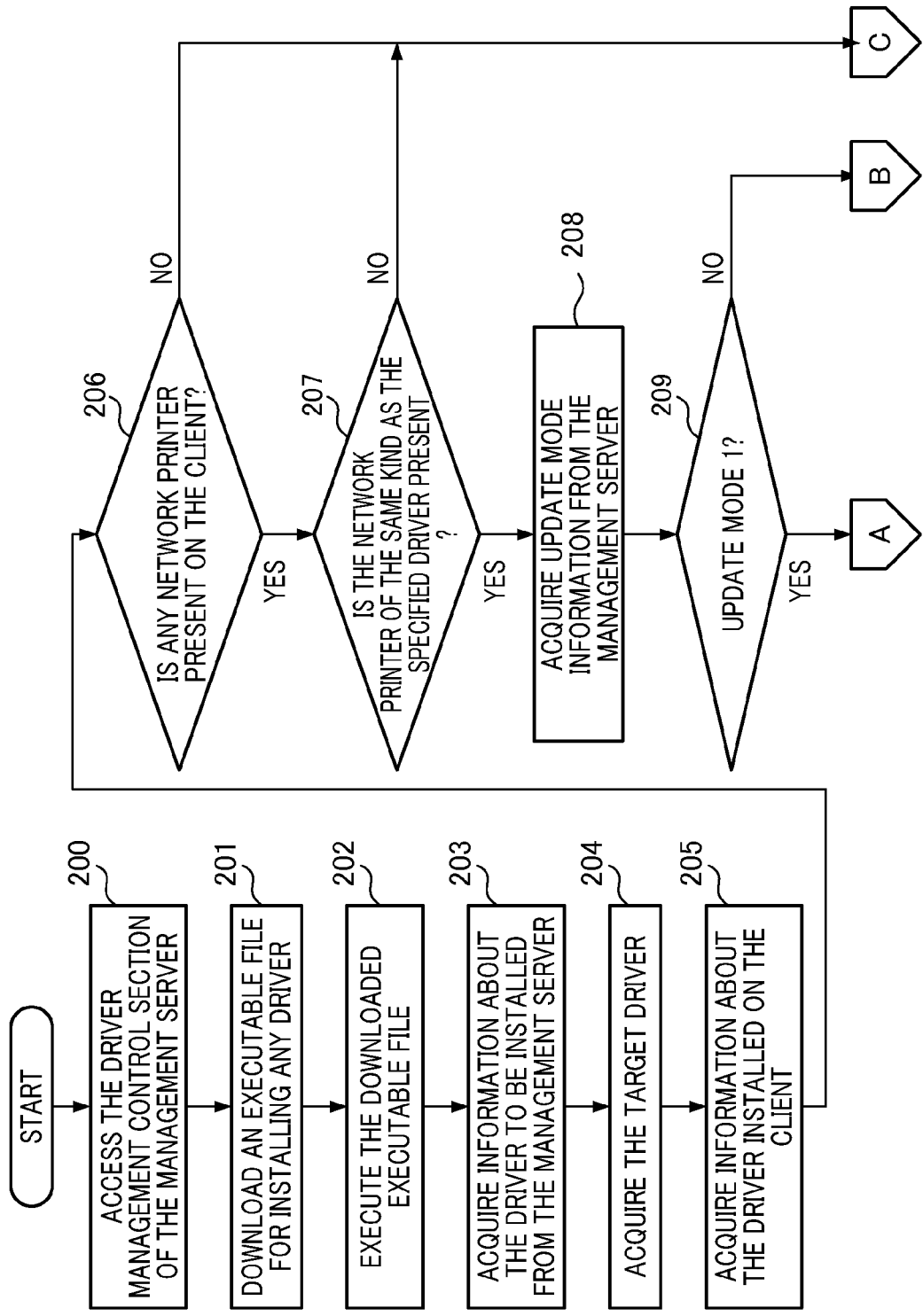
FIG. 1A is a flowchart illustrating exemplary processing of the client according to an embodiment of the present invention together with FIGS. 2 to 10.

Each of FIGS. 1A and 1B is a flowchart illustrating exemplary client processing performed by the executable file section 3710 of the client 3000. Note that numbers 2, 9, and 10 shown in a pentagonally-shaped frame in FIGS. 1A and 1B denote the corresponding positions shown in FIG. 5.

FIG. 3 shows an exemplary user interface screen for update mode settings, which is used when a new driver is installed on the client 3000. The user interface screen is provided by the driver management control section 1711 of the management server 1000. In this example, a desired mode can be selected from four options: update modes 1 to 4, and a registration button to be used after selection and a cancel button for canceling a selection are provided on the screen.

FIG. 4 is a flowchart illustrating the flow of setting processing shown in FIG. 3 performed by the driver management control section 1711 of the management server 1000.

FIG. 5 is a flowchart illustrating the flow of administration server processing performed by the driver management control section 1711 of the management server 1000. Note that numbers 3 and 4 shown in a pentagonally-shaped frame in FIG. 5 denote the corresponding positions shown in FIG. 6A. In addition, numbers 5 and 6 shown in a pentagonally-shaped frame in FIG. 5 denote the corresponding positions shown in FIG. 6B, and numbers 7 and 8 shown in a pentagonally-shaped frame in FIG. 5 denote the corresponding positions shown in FIG. 6C.

Figure 6A:
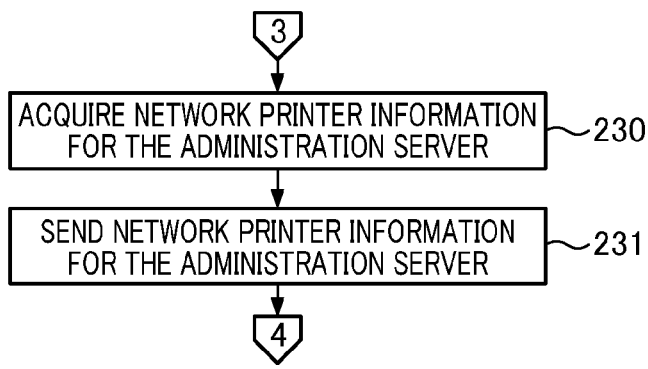
FIG. 6A is a flowchart illustrating exemplary processing performed at the client.

FIG. 6A is a flowchart illustrating the flow of client processing performed by the executable file section 3710 of the client 3000.

Figure 6B:
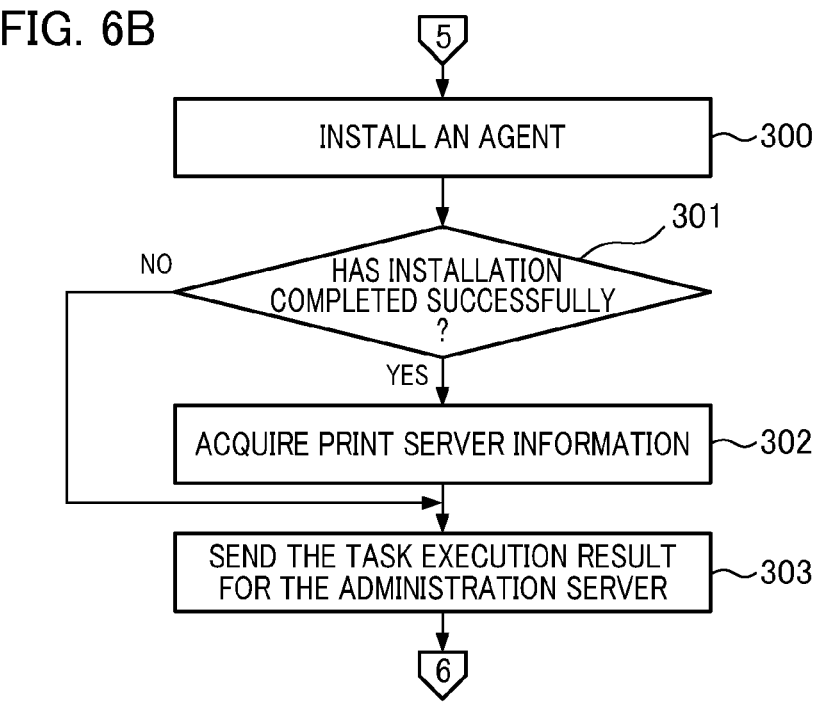
FIG. 6B is a flowchart illustrating exemplary installation processing performed at the print server.

FIG. 6B is a flowchart illustrating the flow of print server processing performed by the driver management service section 4710 of the print server 4000.

Figure 6C:
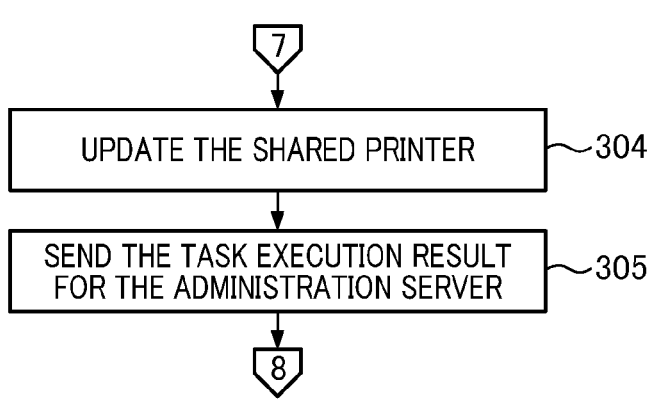
FIG. 6C is a flowchart illustrating exemplary shared printer update processing performed at the print server.

FIG. 6C is a flowchart illustrating the flow of print server processing performed by the driver management service section 4710 of the print server 4000.

FIG. 7 shows an exemplary so-called database table that is stored in the information management section 1712 of the management server 1000.

FIG. 7A shows the table in which the update mode selection information shown in FIG. 3 is stored. In the present embodiment, data in update mode 1 is stored in the table.

FIG. 7B shows the table in which client information transmitted to the management server 1000 is stored by the client processing shown in FIGS. 1A and 1B. In the present embodiment, the network printer name is "printer A", its driver name is "driver A", and its version is 1.00. The print server name is "print server 4000", and the shared printer name is "shared printer B".

FIG. 7C shows the table managed by the driver management control section 1711 of the management server 1000, in which information relating to the print server 4000 is stored. In the present embodiment, the print server name is "print server A", and the shared printer name is "shared printer A". The driver name is "driver A", its version is 1.00, and the printer name is "printer A".

First, first to fourth update modes will be described with reference to FIG. 3.

The first update mode (hereinafter referred to as "update mode 1") is a mode for changing a network printer to a local printer when a driver to be installed on the local printer is the same kind as that of the network printer and both printers are used in common. In other words, when the driver to be newly installed on the local printer is the same kind as that of the existing network printer, and the driver itself is also the same kind, the network printer is changed to the local printer so as to ensure the integrity of the drivers. In the update mode 1, the local printer to be newly generated on the client is prioritized, and hence it is understood that the PULL mode is prioritized.

In contrast, the second to the fourth update modes are prioritized on the print server mode.

The second update mode (hereinafter referred to as "update mode 2") brings the print server 4000 under control when the print server 4000 is not brought under control. With the present mode, the integrity of the drivers to be used by the shared printer on the print server, the network printer on the client, and the local printer is ensured. Here, the term "to bring the print server 4000 under control" means to bring the print server 4000 under the control of the driver management control section 1711. At this time, the driver management service section 4710 is installed on the print server 4000, and then, as shown in FIG. 7C, shared printer information on the print server 4000 is managed by the information management section 1712.

The third update mode (hereinafter referred to as "update mode 3") is a mode for ensuring the integrity between drivers when the print server 4000 is a client under the control of the driver management control section 1711. In other words, the update mode 3 ensures the integrity of the drivers among the shared printer on the print server 4000, the network printer on the client 3000, and the local printer.

The fourth update mode (hereinafter referred to as "update mode 4") is a mode for prioritizing the driver version of the network printer on the client 3000 irrespective of whether or not the print server 4000 is brought under the control of the driver management control section 1711.

In the aforementioned description, the term "to ensure the integrity of the drivers" means to ensure the identity of the kind and version of the drivers so as to make each driver operate normally.

Figure 10:
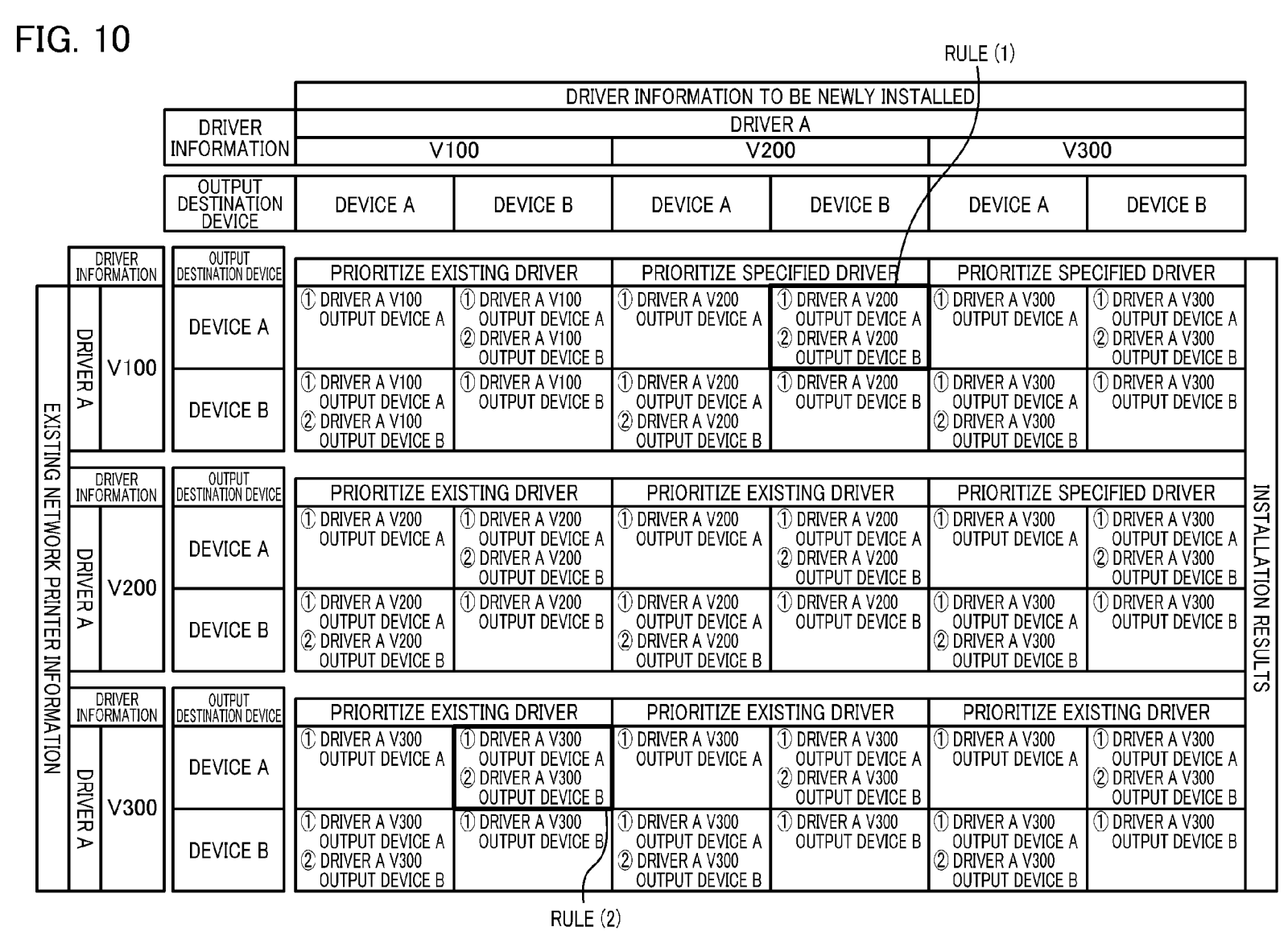

FIG. 10 is a diagram illustrating an exemplary table of installation rules to be applied when update mode selection information in FIG. 3 indicates update mode 1. More specifically, the installation rule table shows what the installation results should be when the driver constituting the existing network printer is the same kind as the driver to be newly installed, but the versions are different from each other. In the left field of the table, versions of the driver A (V100, V200, V300) and the output destination devices (device A, device B) regarding existing network printer information are shown. In the upper field of the table, versions of the driver A (V100, V200, V300) and the output destination devices (device A, device B) regarding the driver information to be newly installed are shown. Here, the term "V300" refers to version 3.00. When the relevant row and column positions are specified from each field, the corresponding installation rule is obtained.

Commonly, when the drivers are the same kind but a different version, the driver with a higher version number is prioritized.

For example, the version of the driver for the existing network printer is 1.00 and the output destination device 2000 is assumed to be the device A (see V100 and device A in the left field). Assume the case where a local printer, in which the version of the driver A is 2.00 and the output destination device 2000 is the device B, is to be newly generated on the client 3000 (see V200 and device B in the top field).

The devices A and B are physically present print ports, i.e., the devices 2000 with a different IP address.

In this case, the rule (1) among the installation rules in FIG. 10 is applied. In other words, it means that the existing network printer is changed to the local printer, in which the output destination device 2000 is the device A, by using the driver A of version 2.00. Furthermore, the rule (1) means generating a newly specified local printer object in which the output destination is the device B.

Another example is that the version of the driver for the existing network printer is 3.00 and the output destination device 2000 is the device A (see V300 and device A in the left field). Assume the case where a local printer, in which the version of the driver A is 1.00 and the output destination device 2000 is the device B, is to be newly generated on the client 3000 (see V100 and device B in the top field).

In this case, the rule (2) among the installation rules in FIG. 10 is applied. In other words, it means that the existing network printer is generated after changing to the local printer, in which the output destination device 2000 is the device A, by using the existing driver A of version 3.00. Furthermore, in the rule (2), it means that a new local printer, in which the output destination is the device B, is also generated by using the existing driver A of version 3.00.

As described above, an appropriate installation rule is obtained depending on the existing network printer information and the driver information to be newly installed. Note that the installation rules in FIG. 10 are intended as an example, a different installation result from that of the present embodiment can of course be obtained by changing the installation rules.

For example, in the latter example, the version of the driver for the existing network printer is compared with that of the newly specified driver. When the version of the driver for the existing network printer is newer than that of the newly specified driver, it is also possible that the existing network printer is not changed to the local printer. For the newly specified local printer, the local printer object, in which the output destination is the device B, is generated by using the driver constituting the existing network printer. Note that the installation rules in FIG. 10 may be acquired from the first driver management control section 1711 of the management server 1000 (see step 203 in FIG. 1A to be described below), or may be incorporated as a part of the executable file section 3710.

Next, the conditions assumed in the present embodiment will now be described.

First, assume that a printer name "printer A", which is supported by a driver having a driver name of "driver A" and a version of 1.00, is installed on the print server 4000. Also, the printer A is a shared printer having the shared name "shared printer A", and the print server 4000 is not yet managed by the driver management control section 1711 of the management server 1000. In other words, management data as shown in FIG. 7C is not in the table. Furthermore, assume that the driver management service section 4710 (see the dotted line frame shown in FIG. 2) that communicates with the driver management control section 1711 of the administration server is not yet installed on the print server 4000.

On the other hand, the network printer having the printer name of "printer A" corresponding to the shared printer having the shared name of "shared printer A" is installed on the client 3000 using the Point and Print function. The driver used for the shared printer "shared printer A" and the driver of the network printer "printer A" for the client 3000 are both the same kind and the same version, and are in the state where they are mutually consistent.

In such a printing system environment, the following driver is assumed to be managed by the information management section 1712 and the driver storage section 1713 of the driver management control section 1711 in the management server 1000.

The driver which is the same kind as that for the network printer (its version is newer that that of the driver for the network printer, i.e., 2.00).

In other words, the driver name is "driver A" and its version is 2.00, and the printer name is "printer A". Here, the printer name may be same as or different from that of the network printer. When the driver is installed on the client 3000, processing for updating a driver used in the network printer on the client 3000 is involved.

Under the aforementioned assumed conditions, processing shown in FIG. 4, which is performed by the management server 1000, will now be described.

First, an IT administrator accesses the device management application section 1710 of the first data control section 1700 by using the first input section 1200 and the first display section 1100 of the management server 1000 (see step 100).

Here, when the application used for the device management application section 1710 is a Web application, such an application can be accessed from a separate client for administrator instead of the management server 1000. When the client for an administrator can remotely access the management server 1000, the device management application section 1710 may use what is referred to as a native application.

Next, an IT administrator uses the first input section 1200 and the first display section 1100 of the management server 1000 so as to perform a selection operation under the update mode setting menu on the first driver management control section 1711 (see step 101). This means that the user interface screen exemplified in FIG. 3 is displayed so as to prompt the IT administrator to carry out an operation, and this screen is under the control of the driver management control section 1711.

Next, during execution of the executable file in the client 3000, the driver management control section 1711 selects the update mode for the user interface screen shown in FIG. 3 when the network printer is present in the client 3000 (see step 102).

Subsequently, when any operation of the registration button on the screen in FIG. 3 has been detected, the driver management control section 1711 stores data indicating the selected update mode into the information management section 1712 (see step 103). For example, as shown in FIG. 7A, the update mode 1 is selected as the update mode.

The above processing is defined as pre-processing. Hereinafter, processing for installing a new driver on the client 3000 will be described.

Processing performed by the client 3000 will be described with reference to FIGS. 1A and 1B.

First, the client 3000 accesses the driver management control section 1711 of the device management application section 1710 in the management server 1000 (see step 200).

Next, the client 3000 downloads an executable file for installing any driver (see step 201).

The client 3000 executes the downloaded executable file (see step 202). Here, the processing being activated by executing the downloaded executable file has the same meaning as the executable file section 3710 on the third data control section 3700 being in operation.

Also, the executable file section 3710 is assumed to hold location information (such as IP address or DNS) of the management server 1000 as a part of the executable file section 3710, when the executable file is downloaded from the driver management control section 1711.

On the other hand, when location information about the management server 1000 is absent, the executable file section 3710 can also have a search function for the management server 1000 using SLP/Multicast or the like.

The executable file section 3710 accesses the driver management control section 1711 of the management server 1000, and acquires driver information about the driver to be installed from the information management section 1712 (see step 203).

Next, the executable file section 3710 acquires the target driver to be newly installed (the driver to be installed) from the driver storage section 1713 of the management server 1000 (see step 204).

In the present embodiment, it is assumed that the version of the acquired driver is 2.00, and its output destination device is the device B.

Subsequently, the executable file section 3710 acquires information about the driver installed on the client 3000 (see step 205).

In the present embodiment, the driver of the client 3000 is the same kind as that which has been acquired in step 204. However, this driver is the driver of version 1.00 for the network printer, and its output destination is the device A. In other words, the existing driver and the driver to be newly installed are both the same kind but different versions, and have a different output destination device as well.

Next, the executable file section 3710 determines whether or not any network printer is present on the client (see step 206). Here, when a network printer is present, and the determination result is "Yes", the processing advances to step 207. If the determination result is "No", the processing advances to step 221.

Next, the executable file section 3710 determines whether or not the network printer having the same kind of driver as the driver to be newly installed is present (see step 207). Here, the determination result is "Yes", the processing advances to step 208. If the determination result is "No", the processing advances to step 221.

Subsequently, the executable file section 3710 acquires update mode information from the driver management control section 1711 of the management server 1000 (see step 208). This information is stored in the information management section 1712 in step 103 shown in FIG. 4.

In the present embodiment, the executable file section 3710 acquires update mode information indicating the update mode 1 as shown in FIG. 7A.

Next, the executable file section 3710 determines whether or not the acquired update mode is the update mode 1 (see step 209). Here, the determination result is "Yes" and thereby the processing advances to step 210. However, if the determination result is "No", the processing advances to step 218.

The executable file section 3710 determines whether or not the version of the driver to be newly installed, i.e., the version of the printer driver to be set up is newer than that of the driver for the existing network printer (see step 210). Here, the determination result is "Yes", the processing advances to step 215.

Subsequently, the executable file section 3710 generates a local printer object using the driver to be newly installed in accordance with the pre-defined installation rules shown in FIG. 10 (see step 215).

Next, the executable file section 3710 determines whether or not the output destination device for the driver to be newly installed is the same as that for the existing network printer (step 216). Here, the determination result is "No", the processing advances to step 217.

Next, the executable file section 3710 generates a local printer object, in which the output destination device for the existing network printer is to be the printer port, by using the driver to be newly installed (see step 217).

Then, setting processing for the printer driver on the print server 4000 is performed (see step 214). This processing includes deletion of the printer settings on the print server corresponding to the network printer. For example, the executable file section 3710 deletes the existing network printer object.

On the other hand, if the determination result in step 210 is "No", the processing advances to step 211. Here, the executable file section 3710 generates a local printer object by using the driver for the existing network printer in accordance with the installation rules shown in FIG. 10.

Next, the executable file section 3710 determines whether or not the output destination device of the driver to be newly installed is the same as that of the existing network printer (see step 212). If the determination result is "No", the processing advances to step 213, whereas if the determination result is "Yes", the processing advances to step 214.

The executable file section 3710 generates a local printer object, in which the output destination device for the existing network printer is to be the printer port, by using the driver for the existing network printer (see step 213). The process is terminated via step 214.

Note that if the determination result in steps 212 and 216 is "Yes", the process is terminated via step 214.

Next, the flow of processing when the update mode 2 is selected will now be described.

When the update mode shown in FIG. 7A is the update mode 2, determination processing in step 209 is performed after steps 200 to 208. Here, the determination result is "No", and the processing advances to step 218.

The executable file section 3710 determines whether the update mode is either the update mode 2 or the update mode 3 (see step 218). Here, the determination result is "Yes", the processing advances to step 219.

The executable file section 3710 determines whether or not the version of the driver to be newly installed is newer than that of the driver for the existing network printer (see step 219). If the determination result is "Yes", the processing advances to step 220, whereas if the determination result is "No", the processing advances to step 225.

The executable file section 3710 requests the task execution for the print server 4000 with respect to the driver management control section 1711 of the management server 1000 (see step 220). Note that the executable file section 3710 also requests the driver information (driver type, version, output destination device) for the driver to be newly installed.

Processing performed by the management server 1000 will be described with reference to FIG. 5.

The driver management control section 1711 receives the task execution request from the client 3000 (see step 104).

Next, the driver management control section 1711 requests network printer information with respect to the executable file section 3710 on the client 3000 (see step 105).

Processing performed by the client 3000, which receives this request, will be described with reference to FIG. 6A.

The executable file section 3710 acquires the network printer information on the client 3000 (see step 230). Here, the network printer information includes the driver information constituting the network printer, and information indicating which shared printer on the print server is synchronized with the network printer.

In the present embodiment, the network printer information includes the following information:

The name of the driver on the print server named "print server A" is "driver A", and its version is 1.00, and the name of the network printer consisting of the shared printer named "shared printer A" is "printer A".

Note that the aforementioned information is registered on a storage area such as the registry of the client, and can be acquired either by searching the registry or by employing API (Application Programming Interface) provided by the operating system.

Next, the executable file section 3710 sends network printer information to the driver management control section 1711 (see step 231).

Referring again to FIG. 5, the continuation of the processing performed by the management server 1000 will be described.

In step 106, the driver management control section 1711 receives network printer information from the executable file section 3710 on the client 3000 so as to store it in the information management section 1712. In the present embodiment, the network printer A corresponding to the driver of the shared name "shared printer A", on the print server A is installed on the client 3000 and its version is 1.00.

Next, the driver management control section 1711 accesses the information management section 1712, and acquires information about the print server and its shared printer that are managed therein (see step 107). An example of this is shown in FIG. 7C. In the present embodiment, it is assumed that there is no print server information under the control of the driver management control section 1711 at that time.

The driver management control section 1711 accesses the information management section 1712, and acquires update mode setting information (see step 108). In this case, the update mode in the acquired update mode setting information is the update mode 2.

Next, the driver management control section 1711 determines whether the update mode is the update mode 2 or the update mode 3 (see step 109). Here, the determination result is "Yes", and the processing advances to step 110.

The driver management control section 1711 compares the network printer information that has been acquired in step 106 with the print server and its shared printer information that have been acquired in step 107 (step 110). Here, comparison means to determine whether or not the driver management control section 1711 manages the print server 4000 on which the shared printer corresponding to the network printer on the client 3000 is installed. If the determination result is "No", the processing advances to step 111.

The driver management control section 1711 generates a task for distributing the driver management service section 4710, which is an agent, to the print server 4000 in order to place the print server 4000 under the control of the driver management control section 1711 (see step 111).

Subsequently, the driver management control section 1711 executes an agent distribution task to the print server 4000 (see step 112). The installation of the driver management service section 4710 to the print server 4000 means, for example, to utilize a remote distribution technique such as WMI, which is incorporated in the OS of Microsoft™ Corp. Note that WMI is an abbreviation for "Windows Management Instrumentation".

Processing performed by the print server 4000 will be described with reference to FIG. 6B.

The fourth data control section 4700 of the print server 4000 performs installation processing of the driver management service section 4710 as an agent task process from the driver management control section 1711 (see step 300).

Next, the fourth data control section 4700 determines whether or not the installation processing of the driver management service section 4710 has been completed successfully (see step 301). If the determination result is "Yes", the processing advances to step 302, whereas if the determination result is "No", the processing advances to step 303.

The driver management service section 4710 acquires print server information that indicates whether or not the shared printer has already been installed on the print server 4000 (see step 302).

Subsequently, the driver management service section 4710 returns the information indicating the success or failure of installation in step 301 and the information that has been acquired in step 302 to the driver management control section 1711 of the management server 1000 (see step 303).

Referring again back to FIG. 5, the continuation of the processing performed by the management server 1000 will be described.

In step 113, on the basis of the agent task results obtained from the driver management service section 4710 of the print server 4000, the driver management control section 1711 determines whether or not the agent task has been completed successfully. If the determination result is "Yes", the processing advances to step 114.

The driver management control section 1711 registers the print server information obtained from the driver management service section 4710 of the print server 4000 to the information management section 1712 (see step 114). In the present embodiment, the information of the print server named "print server A" as shown in FIG. 7C is assumed to be registered.

Next, the driver management control section 1711 returns to step 110, and performs determination processing. This time the determination result is "Yes", and the processing advances to step 115. Here, the driver management control section 1711 generates a driver update task for the shared printer located on the print server 4000. In the present embodiment, the driver update task refers to generating a task for updating the driver A on which the shared name of the print server 4000 is "shared printer A" from version 1.00 to version 2.00.

Next, the driver management control section 1711 executes the generated driver task for the driver management service section 4710 of the print server 4000 (see step 116).

Processing performed by the print server 4000 will be described with reference to FIG. 6C.

The driver management service section 4710 updates the driver for the shared printer A such that the version of the driver is updated from 1.00 to 2.00 (see step 304).

Next, the driver management service section 4710 returns the task execution results back to the driver management control section 1711 of the management server 1000 (see step 305).

Referring again back to FIG. 5, the continuation of the processing performed by the management server 1000 will be described.

In step 117, the driver management control section 1711 determines whether or not the driver update task in step 116 has been completed successfully. If the determination result is "Yes", the processing advances to step 118.

The driver management control section 1711 directs driver update task processing involving an update for the network printer to the executable file section 3710 of the client 3000 (see step 118).

Referring back to FIG. 1B, processing performed by the client 3000 will be described.

In step 221, the executable file section 3710 executes installation processing of the local printer involving a driver update for the network printer. Then, the series of processes is terminated.

On the other hand, if the determination result in step 113 shown in FIG. 5 is "No" or if the determination result in step 117 is "No", the processing advances to step 224 after step 223 in FIG. 1B (determination result is "Yes"). The executable file section 3710 of the client 3000 does not perform processing such as the addition of a printer or an update of a driver, and the series of processes is terminated.

Next, the flow of processing when the update mode 3 is selected will now be described.

In this case, it is assumed that the driver management control section 1711 of the management server 1000 brings the print server for the shared printer corresponding to the network printer on the client 3000 under its control. In other words, this means that information shown in FIG. 7C has been registered on the information management section 1712.

Processing performed by the management server 1000 will be described with reference to FIG. 5.

Processing in steps 104 to 109 is the same as that described above.

In step 110, the driver management control section 1711 brings the print server for the shared printer corresponding to the network printer on the client 3000 under its control. Hence, the determination result is "Yes", and the processing advances to step 115. The following processing is the same as that described in steps 115 to 118 in FIG. 5, steps 304 and 305 in FIG. 6C, and steps 221 and 224 in FIG. 1B, and the description thereof will be omitted herein to avoid repetition.

Next, the flow of processing when the update mode 4 is selected will now be described.

Processing performed on the client 3000 will be described with reference to FIGS. 1A and 1B.

Processing in steps 200 to 208 is the same as that described above. The determination result in step 209 is "No", and the processing advances to step 218. Here, the determination result in step 218 is "No", and the processing advances to step 222. The executable file section 3710 determines whether or not the update mode is the update mode 4. Here, the determination result is "Yes", and the processing advances to step 223.

The executable file section 3710 determines whether or not the version of the driver to be newly installed is newer than that of the driver for the existing network printer (see step 223). If the determination result is "Yes", the processing advances to step 224. Here, the executable file section 3710 of the client 3000 does not perform processing such as an addition of a printer or an update of a driver, and the series of processes is terminated.

If the determination result in step 219 or 223 is "No", that is, if the version of the driver to be newly installed is the same as or older than that of the existing network printer, the processing advances to step 225. Here, the executable file section 3710 newly installs the local printer by using the driver constituting the existing network printer, and the series of processes is terminated.

Also, if the determination result in steps 206 and 207 is "No", the processing advances to step 221. Here, the executable file section 3710 performs processing such as an addition or an update for a local printer, and the series of processes is terminated.

If the determination result in step 109 shown in FIG. 5 is "No", the processing advances to step 119. Here, the driver management control section 1711 provides instructions about which version of the network printer is prioritized to the executable file section 3710 of the client 3000. After the executable file section 3710 has executed the processing in steps 223 to 225 shown in FIG. 1B, the series of processes is terminated.

Note that after the processing in steps 214, 221, 224, and 225 shown in FIGS. 1A and 1B, the installation processing result may be displayed. In other words, the processing result is displayed on the third display section 3100 of the client 3000 by using a message box, which provides an attention to an operator.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-096011 filed Apr. 10, 2009 which are hereby incorporated by reference herein in its entirety.

What is claimed is:

1. An information processing apparatus that has installed a first printer driver for printing by using a shared printer in a print server, comprising:
   a determination unit configured to, if an installation of a second printer driver is instructed, determine whether or not the second printer driver is the same kind of printer driver as the first printer driver, and whether or not a version of the second printer driver is newer than a version of the first printer driver; and
   a control unit configured to, if the determination unit determines that the second printer driver is the same kind of printer driver as the first printer driver and that the version of the second printer driver is newer than the version of the first printer driver, carry out control to perform a setting process for an existing printer object corresponding to the first printer driver and to set up a new printer object corresponding to the second printer driver,
   wherein the second printer driver is used for printing by using a printer connecting with the information processing apparatus via a communication line without the intervention of the print server.

2. The information processing apparatus according to claim 1, wherein the control unit deletes the existing printer object corresponding to the first printer driver as the setting process if the determination unit determines that the second printer driver is the same kind of printer driver as the first printer driver and that the version of the second printer driver is newer than the version of the first printer driver.

3. The information processing apparatus according to claim 2, wherein, if an output destination device of the new printer object is different from an output destination device of the existing printer object, the control unit sets the output destination device of the existing printer object for the new printer object corresponding to the second printer driver.

4. The information processing apparatus according to claim 1, wherein the control unit updates, in response to updating a printer driver for the shared printer in the print server, the existing printer object corresponding to the first printer driver as the setting process if the determination unit determines that the second printer driver is the same kind of printer driver as the first printer driver and that the version of the second printer driver is newer than the version of the first printer driver.

5. A management server connecting with an information processing apparatus that has installed a first printer driver for printing by using a shared printer in a print server, comprising:
   an instruction unit configured to perform an instruction for updating by using a second printer driver to the print server if, in installing the second printer driver in the information processing apparatus, it is determined that the second printer driver is the same kind of printer driver as the first printer driver and that a version of the second printer driver is newer than a version of the first printer driver,
   wherein the second printer driver is used for printing by using a printer connecting with the information processing apparatus via a communication line without the intervention of the print server, and
   wherein, in response to the updating in the print server, a printer object corresponding to the second printer driver is set up in the information processing apparatus.

6. An information processing method for installing a first printer driver for printing by using a shared printer in a print server, the information processing method comprising:
   determining, if an installation of a second printer driver is instructed, whether or not the second printer driver is the same kind of printer driver as the first printer driver, and whether or not a version of the second printer driver is newer than a version of the first printer driver; and
   controlling, if it is determined that the second printer driver is the same kind of printer driver as the first printer driver and that the version of the second printer driver is newer than the version of the first printer driver, to perform a setting process for an existing printer object corresponding to the first printer driver and to set up a new printer object corresponding to the second printer driver, wherein the second printer driver is used for printing by using a printer connecting with the information processing apparatus via a communication line without the intervention of the print server.

7. The information processing method according to claim 6, wherein the existing printer object corresponding to the first printer driver is deleted as the setting process if it is determined that the second printer driver is the same kind of printer driver as the first printer driver and that the version of the second printer driver is newer than the version of the first printer driver.

8. The information processing method according to claim 7, wherein, if an output destination device of the new printer object is different from an output destination device of the existing printer object, the output destination device of the existing printer object is set for the new printer object corresponding to the second printer driver.

9. The information processing method according to claim 6, wherein, in response to updating a printer driver for the shared printer in the print server, the existing printer object corresponding to the first printer driver is updated in the setting process if it is determined that the second printer driver is the same kind of printer driver as the first printer driver and that the version of the second printer driver is newer than the version of the first printer driver.

10. A management method for connecting with an information processing apparatus that has installed a first printer driver for printing by using a shared printer in a print server, the management method comprising:

instructing for updating by using a second printer driver to the print server if, in installing the second printer driver in the information processing apparatus, it is determined that the second printer driver is the same kind of printer driver as the first printer driver and that a version of the second printer driver is newer than a version of the first printer driver, wherein the second printer driver is used for printing by using a printer connecting with the information processing apparatus via a communication line without intervention of the print server, and wherein, in response to the updating in the print server, a printer object corresponding to the second printer driver is set up in the information processing apparatus.

11. A non-transitory computer-readable medium which stores a program that causes a computer to execute the method according to claim 6.

* * * * *